May 30, 1967
G. L. GRIFFITH ETAL
3,321,886
METHOD AND APPARATUS FOR ENVELOPING
EXPLOSIVE CARTRIDGES
Filed Feb. 5, 1965
3 Sheets-Sheet 1
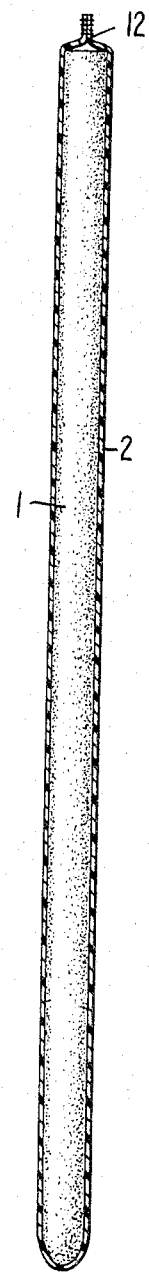
FIG. 1
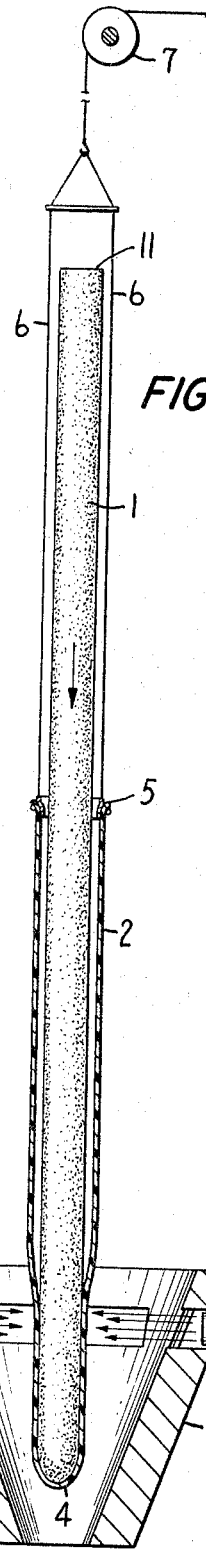
FIG. 2
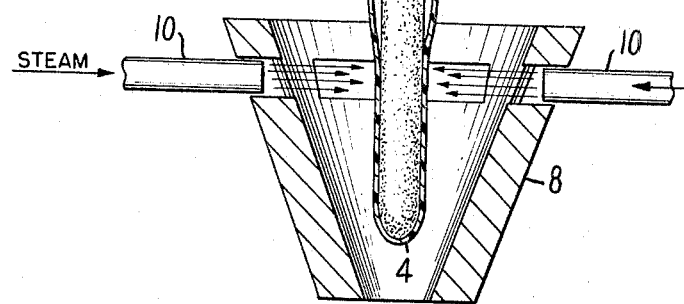

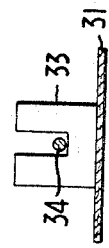
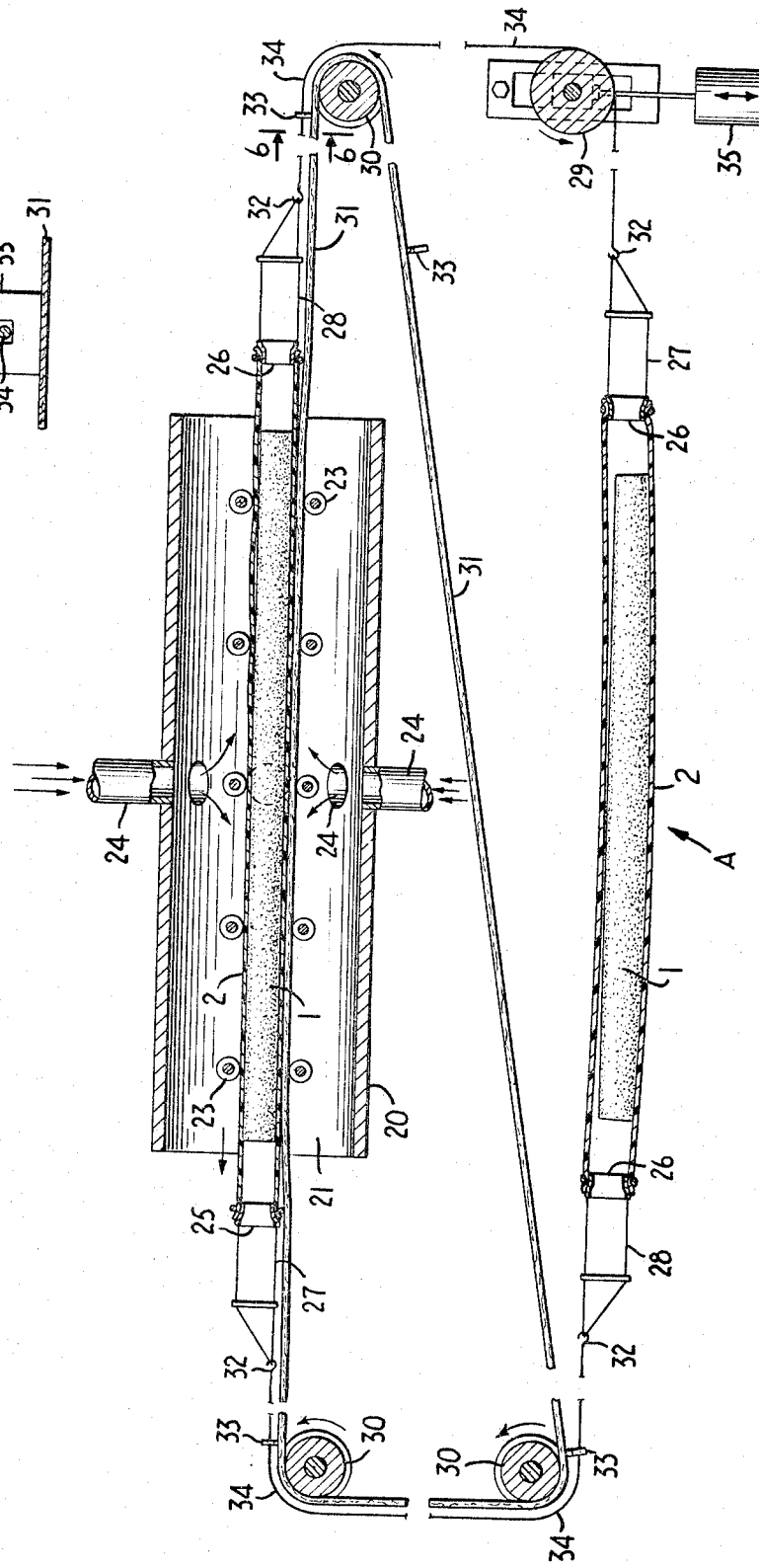

United States Patent Office 3,321,886
Patented May 30, 1967

3,321,886
METHOD AND APPARATUS FOR ENVELOPING EXPLOSIVE CARTRIDGES
George L. Griffith, Coopersburg, and Clarence B. Koch, Allentown, Pa., assignors to Trojan Powder Company, Allentown, Pa., a corporation of New York
Filed Feb. 5, 1965, Ser. No. 432,451
11 Claims. (Cl. 53—30)

This application is a continuation-in-part of application Serial No. 259,120, filed Feb. 18, 1963, and now abandoned.

This invention relates to a method and apparatus for enclosing shaped explosives in a uniform plastic protective envelope.

Many explosive cartridges that are commercially available are plastic coated with such materials as for example, polyethylene, polyvinyl chloride and the like. The plastic coating is applied in order to protect the cartridge and its contents from potentially harmful effects of moisture, air and other deleterious substances in its immediate environment and also to prevent the escape of any of the materials contained in the cartridge.

Because of their nature, explosive cartridges should not be subjected to elevated temperatures for any appreciable lengths of time, and further should not be subjected to high pressures or other rough handling techniques of the type that might be encountered in conventional molding operations. The wrapping of one or more layers of a plastic sheet material about an explosive cartridge to form a protective envelope is generally unsatisfactory. The shape of most cartridges requires a spiral wrapping operation, which leads to differences in the thickness of the enveloping layer over the length of the cartridge. The use of a plurality of abutting layers of plastic sheet in place of the overlapping layers is equally undesirable because of the difficulty of obtaining adequate seals between abutting layers.

In a commonly used packaging procedure, a cartridge is enclosed within a loosely fitting bag of a plastic material such as polyethylene film. The open end of the bag is sealed, and the assembly is passed through an oven maintained at a temperature of about 450 to 500° F. to cause the polyethylene film to shrink about the cartridge. Since, to avoid overheating, the heat treatment is generally carried out by placing the cartridge and bag on a belt moving through an oven, the polyethylene bag is heated unevenly, thereby leading to the formation of irregularities in the surface of the plastic enclosure, such as crinkles, folds and creases. An appreciable excess of plastic material is generally employed, in order to ensure that the cartridge is adequately covered. Prolonged exposure to the high temperatures required is not however desirable for conventional cap-sensitive explosives.

The present invention permits the rapid enveloping of shaped explosives of all types without overlong exposure to high temperatures or pressures. In accordance with the method of this invention, a shaped explosive is placed into a plastic envelope, and the plastic envelope and contents are then heated while circumferentially shrinking and longitudinally stretching the envelope and causing the envelope to adopt the shape of the explosive. The envelope is then sealed to complete the envelopment of the shaped explosive in the enclosure.

The apparatus of the invention comprises, in combination, means for restrictedly heating only a selected portion of the envelope, and means for subjecting the envelope to stretching stress in one direction, while permitting it to shrink in a direction transverse to the first while the envelope is being heated, so that the envelope can be made to snugly enclose the shaped explosive.

The plastic film from which the envelope is fabricated is preferably heat-shrinkable. Generally, any heat-shrinkable plastic material that is capable of being formed into a self-sustaining film and that is sufficiently flexible in the thickness employed to shrink into close conformity to the contour of the shaped explosive upon application of heat in the absence of externally applied pressure can be employed. Films having a thickness of from about 0.5 to 15 mils are satisfactory, but these limits are not critical. The minimum thickness of materials will be determined by the film strength and the weight of the cartridge that will have to be enclosed. The heavier the cartridge the stronger the film that may be required. Polyolefins, such as polyethylene and polypropylene, which have been treated so as to be heat-shrinkable, are preferred as plastic materials, but many other types of shrinkable plastic materials can be used, including, for example, heat-shrinkable polyvinyl chloride, polyvinylidene chloride, nylon, polyacrylonitrile, polycaprolactam, polyethylene terephthalate ("Mylar"), polybutadiene, polyurethanes, natural and synthetic rubbers, polyepoxide resins and the like.

The shape of envelope used initially is in accordance with the shape of the explosive, preferably but not necessarily cylindrical in shape if the explosive is a cylindrical cartridge and open at one end. The parameters for any envelope must be determined by reference to the shaped explosive to be enclosed therein, and to the percentage shrinkability of the film. The internal width of the plastic envelope should be from about 10 to about 50% greater than the average external width of the explosive. The length of the plastic envelope should be from about 40% to about 75% of the length of the explosive, thereby ensuring that when the explosive is initially inserted in the envelope, from 25 to 60% of the length of the explosive will extend beyond the end of the envelope. Thus, to fit the cartridge, the envelope must shrink widthwise and stretch lengthwise.

Any shaped explosive can be enveloped in accordance with this invention, including shaped solid mass as obtained from a molding process, and packages containing therein a solid, a liquid, a semi-solid, a gelled liquid, or a particulate explosive composition, or any other form. A shaped explosive, in accordance with this invention, is any explosive charge in a particular shape either because of previous treatment or previous packaging in a container, and capable of retaining this shape during the enveloping operation. The dimensions and shape of the explosive are immaterial to the practice of this invention. Very short shaped explosives and very long shaped explosives as well as irregularly shaped explosives can be enveloped.

The method of heating the explosive envelope to effect enclosure is quite important. To avoid overheating the explosive itself and to avoid rapid expansion or contraction of the envelope wall, which could lead to rupture and/or uneven enclosure, it is preferred that only very small portions of the assembly be exposed to heat at any one time. It is preferred, in addition, that the heating medium be prevented from coming into direct contact with the envelope. There are several convenient methods of carrying out this incremental heating step. For example, the container bearing the cartridge can be passed slowly through a stream of a hot fluid, such as a hot gas. Preferably not more than about 5% of the length of the container is exposed to the hot fluid at any one time. Good results may not be obtained when more than 10% of the length of the envelope is so exposed at one time.

The hot fluid to which the container is subjected is preferably at a temperature within the range from about 200° F. to about 400° F. The greater the specific heat of the fluid, the lower the temperature that need be employed for optimum results. The hot fluid used should, of course, be non-explosive and inert, under the treatment conditions, to the particular plastic material employed. Steam, either saturated or superheated, at a temperature of between 212° F. and 250° F. is preferred. Other hot gases such as air, nitrogen, carbon dioxide, nitrous oxide, helium, and liquids and vapors of volatile liquids such as propanol can also be used. The quantity of hot fluid employed will depend upon the shrinking characteristics and the coefficient of expansion of the particular envelope material as well as on the heat capacity of the particular hot fluid. In the case of polyethylene envelopes used to envelop 36 inch long cartridges, if saturated steam at atmospheric pressure is the hot gas used, the cartridge will pass through the heating unit in a period of from about 1.5 to 15 seconds, preferably about 2.5 to 10 seconds, when the steam is supplied at the rate of 6.7 pounds per hour. Appropriate changes can be made for other envelope materials and other flow rates and hot gases.

As indicated above, the heated fluid such as steam should contact the plastic envelope only over a localized area. Heating of the entire envelope or of the entire envelope and the explosive, such as by placing it in an oven, is unsatisfactory in this process, since it can lead to the shaped explosive's breaking through the bottom of the envelope. Even if the explosive were retained by the envelope, the final surface coating would be non-uniform. On the other hand, when heat is restricted incrementally to selected portions of the envelope, a substantially uniform enclosure results.

Heating is preferably accomplished by conducting the envelope in a vertical or horizontal direction past a heating means such as a series of steam jets or other hot gas ducts so positioned as to heat only up to about 10% of the length of the envelope at any one time. The heated gas jet or duct should be wide enough, or if necessary, a plurality of horizontally disposed jets or ducts can be used, to heat the entire circumference of the container over the restricted area. Thus, at any one time, the heated gas jets or ducts would be heating substantially the entire circumference within a longitudinal increment of the container of about ¼-inch to one inch. For example, an explosive in a polyethylene envelope can be passed through a ¼ to one inch long steam jet area at a rate equivalent to about 0.3 to 3 feet of envelope per second. Thus, a one foot cartridge would pass through the steam jet area in from about 0.3 to 3 seconds. These rates can be varied, depending upon the characteristics of the plastic material and the volume and specific heat of the heated gas.

An alternative method of accomplishing the restricted area heating for this invention uses a vessel filled with a liquid having a relatively low thermal conductivity. A portion of the liquid such as the top two or three inches or a two to three inch long horizontal zone is heated at a temperature of from 200 to 400° F., while the remainder of the liquid is maintained at a lower temperature. Two immiscible liquids can conveniently be employed in this method, passing the assembly therethrough in a vertical direction, in which case, the liquid employed in the cooler region is preferably of a relatively low thermal conductivity. The explosive envelope assembly is slowly immersed in the liquid, first passes through the heated zone, and then the cooler zone, and is withdrawn either through a special outlet port or through the top of the vessel after the heated portion of the liquid has either been withdrawn or cooled.

Further details of a preferred method of carrying out this invention can be had by reference to the accompanying drawings wherein:

FIGURE 1 is a cross-sectional view of an explosive cartridge enveloped in accordance with this invention by the apparatus of FIGURE 2;

FIGURE 2 is a cross-sectional view of an apparatus useful in accordance with this invention in the process of enveloping an explosive cartridge;

FIGURE 5 is a cross-sectional view of another embodiment of apparatus in accordance with this invention;

FIGURE 6 is a sectional view of the belt of FIGURE 5.

Figure 4:
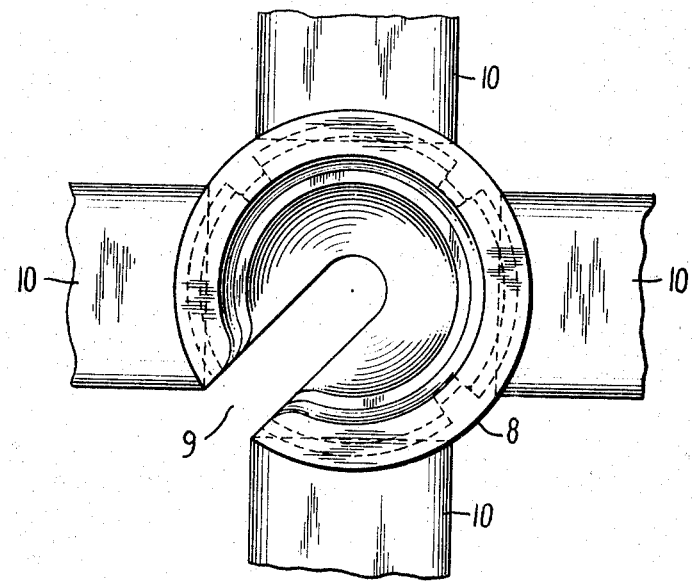
FIGURE 4 is a top view in perspective of the apparatus of FIGURE 3.
Figure 3:
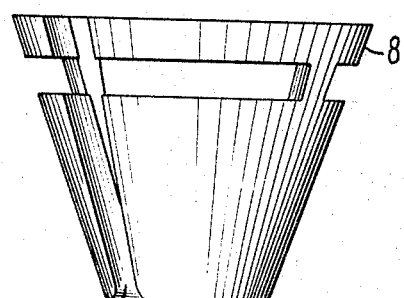
FIGURE 3 is a perspective view of the heating apparatus of FIGURE 2.

The heating apparatus of FIGURES 2 to 4 comprises a thin walled metal funnel 8 circular in cross section with a central passage 9. A plurality of jets 10 for delivery of heated gas to the passage 9 are disposed circumferentially around the funnel, two inches from the top thereof, and extending over a length of ½-inch. These gas jets are connected to a source, not shown, of a heated gas such as steam supplied at 220° F. to 240° F.

Supporting means for passing a shaped explosive and envelope through the passage 9 comprises a clamping ring 5 held by pulley wires 6 attached to pulley 7. The ring 5 is adapted to grasp the open top end of an envelope, and can be lowered and raised by movement of pulley wires 6 over pulley 7. As shown, a cylindrical explosive cartridge filled with explosive is carried by a loosely-fitting plastic envelope 2 of polyethylene film, which envelope 2 is in turn held by the ring 5.

In operation, the cartridge 1 and envelope 2 are lowered by means of pulley 7 and wires 6 in to and through funnel 8 at a predetermined rate of speed, while at the same time heated gas is sprayed into the passage 9 of the funnel through jets 10. As envelope 2 is gradually lowered into and through the funnel 8, as shown in FIGURE 2, the envelope shrinks circumferentially to tightly engage the cartridge and stretches longitudinally, under the weight of the cartridge. The rate of travel of the envelope is adjusted to ensure a rate of stretching of the envelope such that heated gas does not directly contact the cartridge. The rate of travel should be such that by the time the uppermost portion of the envelope 2 is in proximity to gas jets 10, the envelope will have stretched sufficiently to extend beyond the top 11 of cartridge 1. The completed cartridge and container assembly is then withdrawn from funnel 8 at the lower end of passage 9. Clamping ring 5 is removed; the sides of top 12 of envelope 2, which is now stretched beyond the top of cartridge 1, are brought together and sealed in conventional fashion, and any excess plastic material trimmed off. The final product, shown in FIGURE 1, is an explosive cartridge enveloped completely in the plastic film, which snugly encloses the entire surface of the cartridge in a substantially uniform envelope.

The heating apparatus of FIGURE 5 comprises a metal-walled heating tunnel 20 circular in cross section with a central passage 21 having disposed therein ten rollers 23 arranged in pairs and a continuous belt 31 run around drive rolls 30 and the lower set of the paired rolls 23, to support the shaped explosive and envelope while passed through the tunnel 20. A plurality of ducts 24 for delivery of heated gas to the passage 9 are disposed circumferentially around the tunnel extending over a length of ½-inch. These gas jets are connected to a source, not shown, of a heated gas such as steam supplied at 220° F. to 240° F.

Tensioning means for drawing out longitudinally and shrinking transversally a shaped explosive and envelope to a fixed extended length while being conducted through the passage 21 comprises a pair of clamping rings 25, 26 held by wires 27, 28, adapted to be attached to hooks 32 at the ends of wire 34. The wire 34 is the tensioning wire, and is retained in U-guides 33, best seen in FIGURE 6, on belt 31, and is looped over reciprocating tensioning roll 29, where tensional stretching force is applied by weight 35. The rings 25, 26 are adapted to grasp the open top end of an envelope, and thus wires 34, 27, 28 can stretch the envelope to the desired finished length by the force of weight 35.

In operation, a cylindrical shaped explosive cartridge 1 filled with explosive is placed within a loosely-fitting plastic envelope 2 of polyethylene film. The envelope 2 is attached to the rings 25, 26 and wires 27, 28, then attached to end hooks 32 of wire 34 at the lowermost position A. The wire 34 towing the envelope 2 and contents is moved forward at a slow rate, towing the envelope around roll 29 into contact with belt 31 and then around roll 30 into the tunnel passage 21. At the same time heated gas is sprayed into the passage 21 of the tunnel 20 through ducts 24. As envelope 2 is gradually towed through the tunnel 20, as shown in FIGURE 5, the envelope shrinks circumferentially to tightly engage the cartridge and becomes set longitudinally, under the tension due to weight 35 applied via wires 27, 28, 34. The rate of travel of the wire 34 belt and envelope is adjusted to ensure a rate of stretching of the envelope such that heated gas does not directly contact the cartridge. By the time the last portion of the envelope 2 has passed the gas ducts 24 the entire envelope will have shrunk into close contact with the cartridge 1. The completed cartridge and container assembly is then withdrawn from tunnel 20 at the left end of passage 21. Clamping rings 25, 26 are removed; the sides of top 12 of envelope 2, which is now stretched beyond the top of cartridge 1, are brought together and sealed in conventional fashion, and any excess plastic material trimmed off. The final product, shown in FIGURE 1, is an explosive cartridge enveloped completely in the plastic film, which snugly encloses the entire surface of the cartridge in a substantially uniform envelope.

It will be apparent that by this device the envelope can be prevented from shrinking more than a predetermined amount by limiting the maximum travel of roll 29 and thus maximum stretch of wire 34. If desired, unlimited shrinkage can be obtained by providing for unlimited travel of roll 29.

From the foregoing, it is readily apparent that the method of this invention can be adapted to the continuous and automatic enveloping of shaped explosives by providing a plurality of funnels or tunnels or by arranging the apparatus such that as soon as one cartridge assembly leaves the funnel or tunnel, a second one enters it, and so on. Other forms of apparatus can also be used to carry out the method of this invention without departing from the basic spirit of the invention.

The following examples in the opinion of the inventors further illustrate preferred embodiments of the process and apparatus of the invention.

*Example 1*

A cylindrical heat-shrinkable polyethylene tube, heat-sealed at one end and having the other end open to form a bag, a wall thickness of 3 mils, an internal diameter of 1¾ inches, and a length of 20 inches, was suspended vertically with its open end at the top in an apparatus of the type shown in FIGURES 2 to 4. An explosive cartridge 1¼ inches in diameter and 36 inches long was inserted vertically into the bag so that the lower end of the cartridge rested on the closed end of the bag. The cartridge was a paper covered cylindrical package of gelled explosive.

The explosive cartridge bag assembly was then gradually lowered through a heated funnel of the type shown in FIGURES 2 to 4 over a period of about 2.5 seconds, and then removed by swinging the assembly out through the lower aperture in the funnel. The gas used as saturated steam at a temperature of about 220° F. After passing through the funnel, the bag was observed to have stretched longitudinally to a length of 38 inches, and to have contracted circumferentially to conform to the contour of the cartridge, while at the same time essentially retaining its original 3 mil thickness throughout.

The container was then unclamped, and heat-sealed at the top immediately above the end of the cartridge. Excess polyethylene was cut off. The finished product was observed to be water-impervious, and capable of detonation by conventional means.

*Example 2*

The procedure of Example 1 was repeated, using an explosive cartridge 3 inches in diameter by 36 inches long. The bag was made of polyethylene tubing, heat-sealed at one end and having a length of 18 inches, a thickness of 8 mils and an internal diameter of 5 inches. The assembly was lowered through the heating apparatus at a rate of about 6 inches per second, after which the bag was observed to have adopted the contours of the cartridge while longitudinally stretching to a length of 39 inches. The finished product was water impervious and capable of detonation by conventional means.

While the invention has been examplified in connection with packaging of explosive cartridges, since it is well suited for that purpose, it will be understood that other objects as well can be enveloped in accordance with the teachings of this invention without departing from the basic spirit thereof. Suitable additional objects that can be packaged include solid food products, pictorial displays, molded objects, and the like.

The embodiments of the invention in which an exclusive property or privilege is claimed are defined as follows:

1. A process for enclosing shaped explosives in a protective envelope which comprises, disposing a shaped explosive within an envelope of heat-shrinkable material, subjecting the envelope to stretching stress in one direction by applying an axial force thereto, while simultaneously passing the envelope and explosive contents through a heated zone to permit the envelope to shrink in a direction transverse to the first until the envelope has enclosed the shaped explosive in a snug fit, and sealing the envelope.

2. A process in accordance with claim 1, wherein the heat-shrinkable material is a polyolefin.

3. A process in accordance with claim 2, wherein the polyolefin is polyethylene.

4. A process in accordance with claim 1, which comprises applying heat to the envelope by bathing it with a heated fluid.

5. A process in accordance with claim 4, wherein the heated fluid is a gas.

6. A process in accordance with claim 4, wherein the gas is at a temperature of from about 212° F. to about 250° F.

7. A process in accordance with claim 4, wherein the heated fluid is a liquid.

8. A process for enclosing shaped explosives in a protective envelope which comprises disposing a shaped explosive within an envelope of heat-shrinkable material, the envelope having a length less than about 75% of the length of the shaped explosive, and passing the envelope and explosive contents through a heated zone while subjecting the envelope to stretching stress in one direction and while permitting it to shrink in a direction transverse to the first, until the envelope has enclosed the shaped explosive in a snug fit, and then sealing the open end of the envelope.

9. A process in accordance with claim 8 wherein the envelope has an internal circumference of from about 10 to 50% greater than the external circumference of the shaped explosive.

10. A process for enclosing shaped explosives in a protective envelope which comprises supporting a vertically positioned shaped explosive within a vertically suspended open bag of heat-shrinkable material to subject the bag to an axial stretching stress while simultaneously exposing successive increments of the bag along its vertical axis to a heated gas, whereby the bag shrinks circumferentially as it is stretched axially to enclose the shaped explosive in a snug fit.

11. A process in accordance with claim 10, wherein the bag has an ititial length of less than 75% of the shaped explosive, and an internal circumference of from about 10 to 50% greater than the external circumference of the shaped explosive.

References Cited

UNITED STATES PATENTS

| | | | |
|---|---|---|---|
| 2,289,668 | 7/1942 | Mallory | 53—30 |
| 2,615,200 | 10/1952 | Cloud | 53—389 |
| 2,664,358 | 12/1953 | Eichler. | |
| 2,969,141 | 1/1961 | Katzin | 206—16.5 |
| 3,127,273 | 3/1964 | Monahan | 53—30 X |

FOREIGN PATENTS 554,048   6/1943   Great Britain.

FRANK E. BAILEY, *Primary Examiner.*

N. ABRAMS, *Assistant Examiner.*